No. 618,720. Patented Jan. 31, 1899.
C. P. OUDIN.
MAIL MARKING MACHINE.
(Application filed Dec. 15, 1897.)
(No Model.) 6 Sheets—Sheet 1.
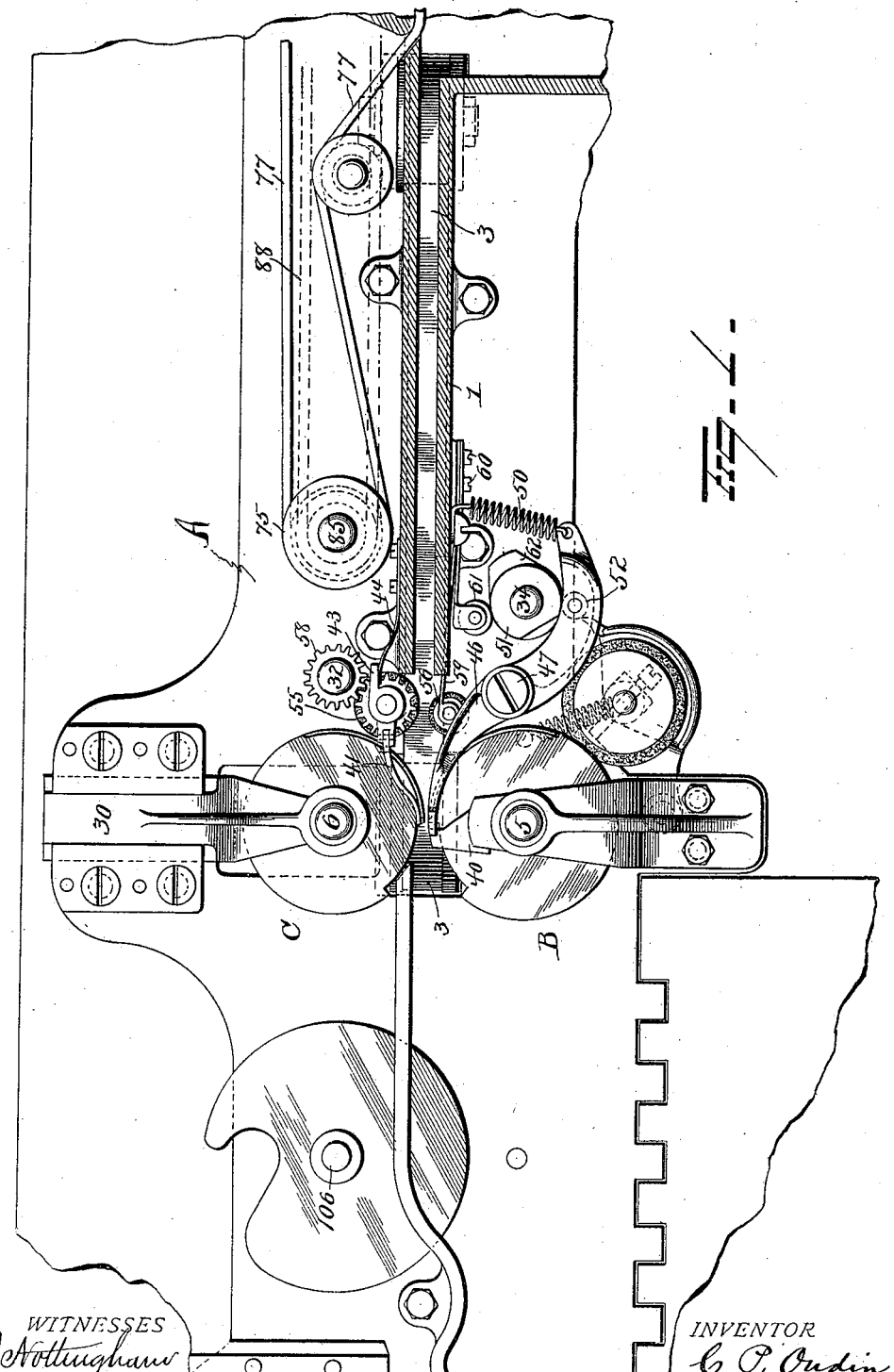
WITNESSES
INVENTOR
Attorney No. 618,720. Patented Jan. 31, 1899.
C. P. OUDIN.
MAIL MARKING MACHINE.
(Application filed Dec. 15, 1897.)
(No Model.) 6 Sheets—Sheet 2.
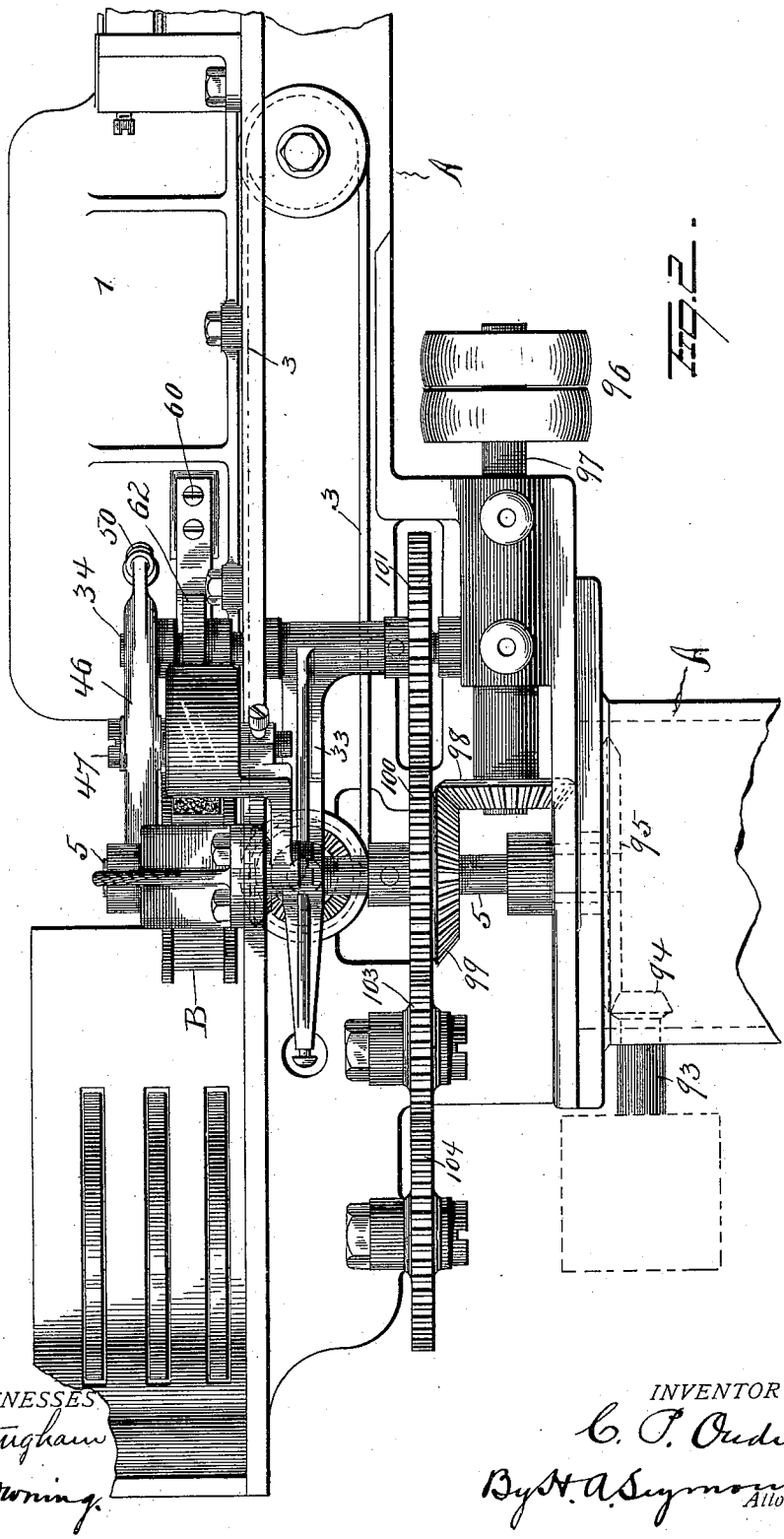

No. 618,720. Patented Jan. 31, 1899.
C. P. OUDIN.
MAIL MARKING MACHINE.
(Application filed Dec. 15, 1897.)
(No Model.) 6 Sheets—Sheet 3.
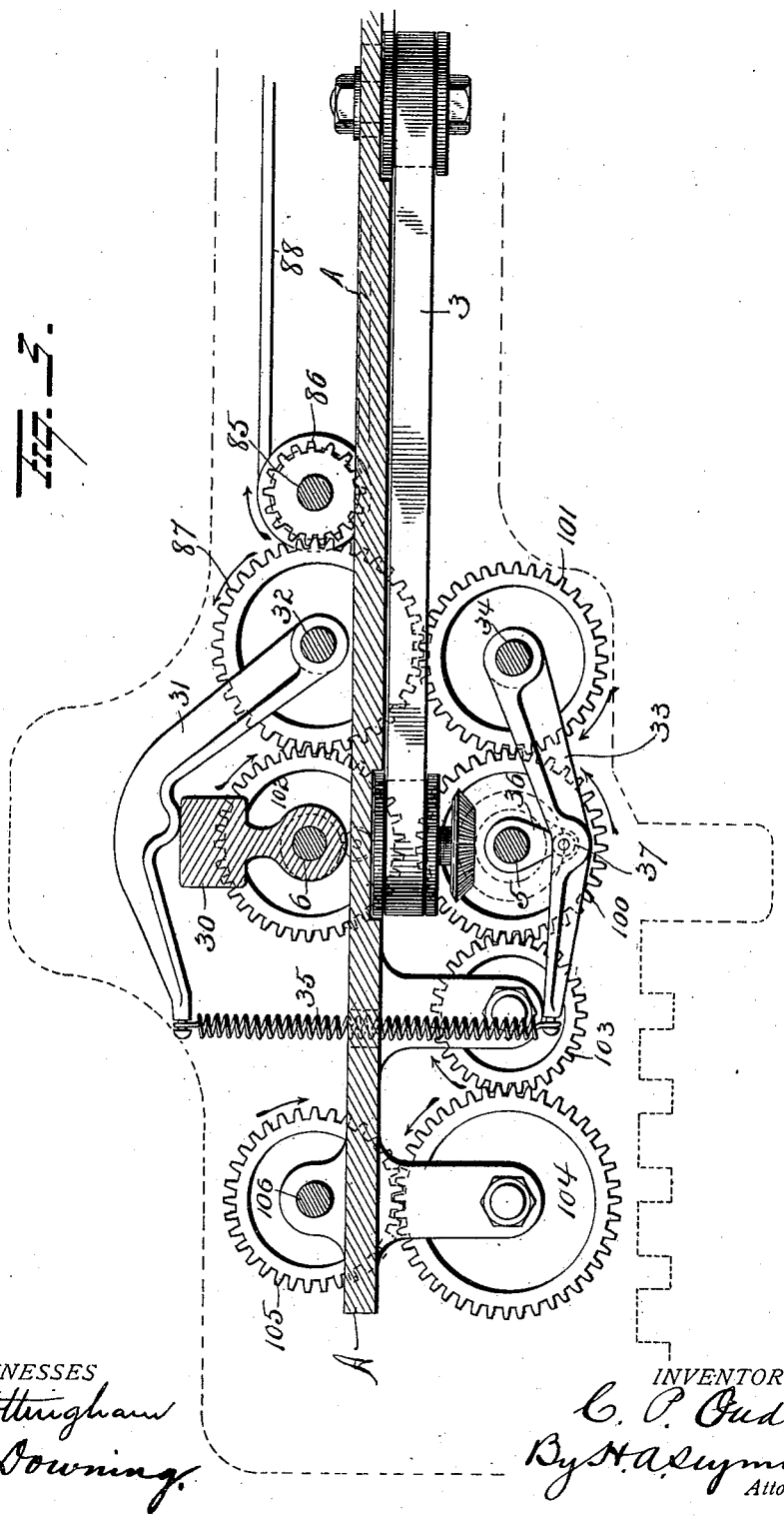
WITNESSES
INVENTOR No. 618,720. Patented Jan. 31, 1899.
C. P. OUDIN.
MAIL MARKING MACHINE.
(Application filed Dec. 15, 1897.)
(No Model.) 6 Sheets—Sheet 4.
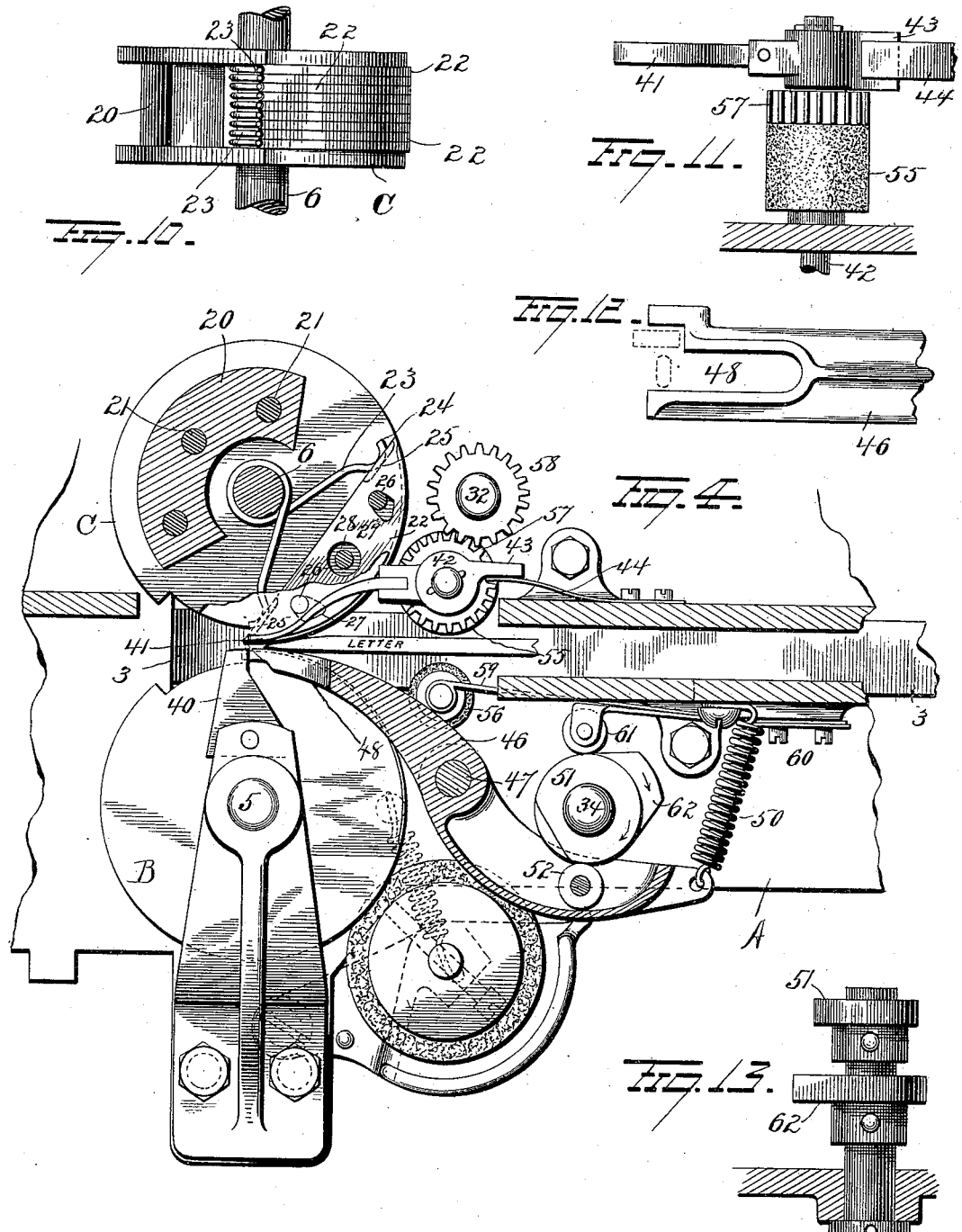

No. 618,720. Patented Jan. 31, 1899.
C. P. OUDIN.
MAIL MARKING MACHINE.
(Application filed Dec. 15, 1897.)
(No Model.) 6 Sheets—Sheet 5.
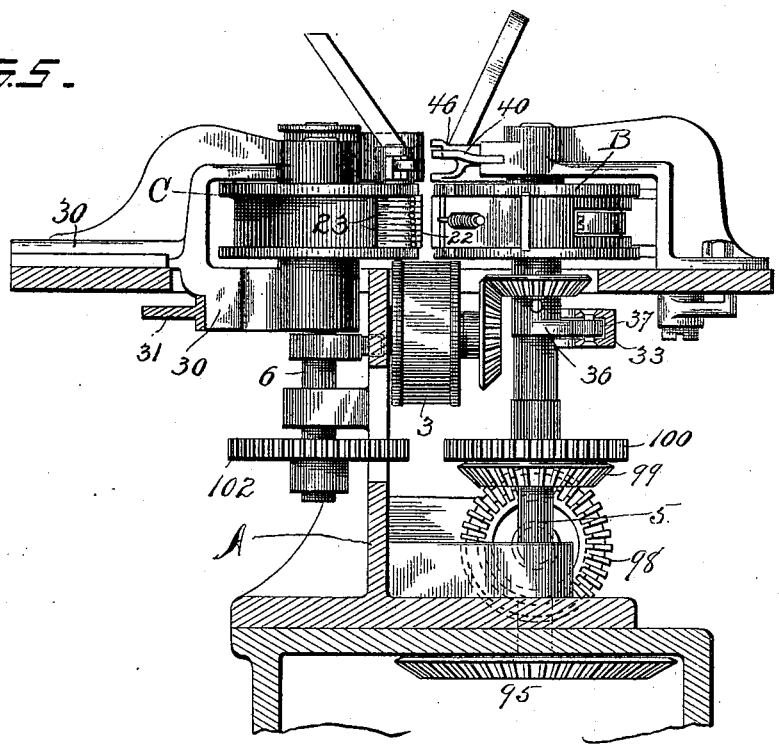
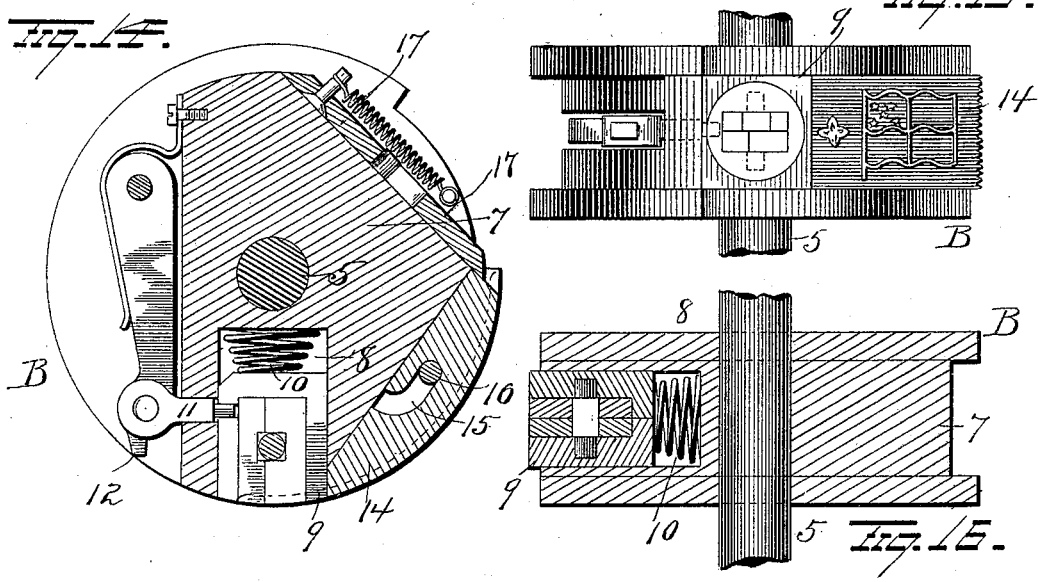
WITNESSES
E. J. Nottingham
G. F. Downing
INVENTOR
C. P. Oudin
By H. A. Seymour
Attorney

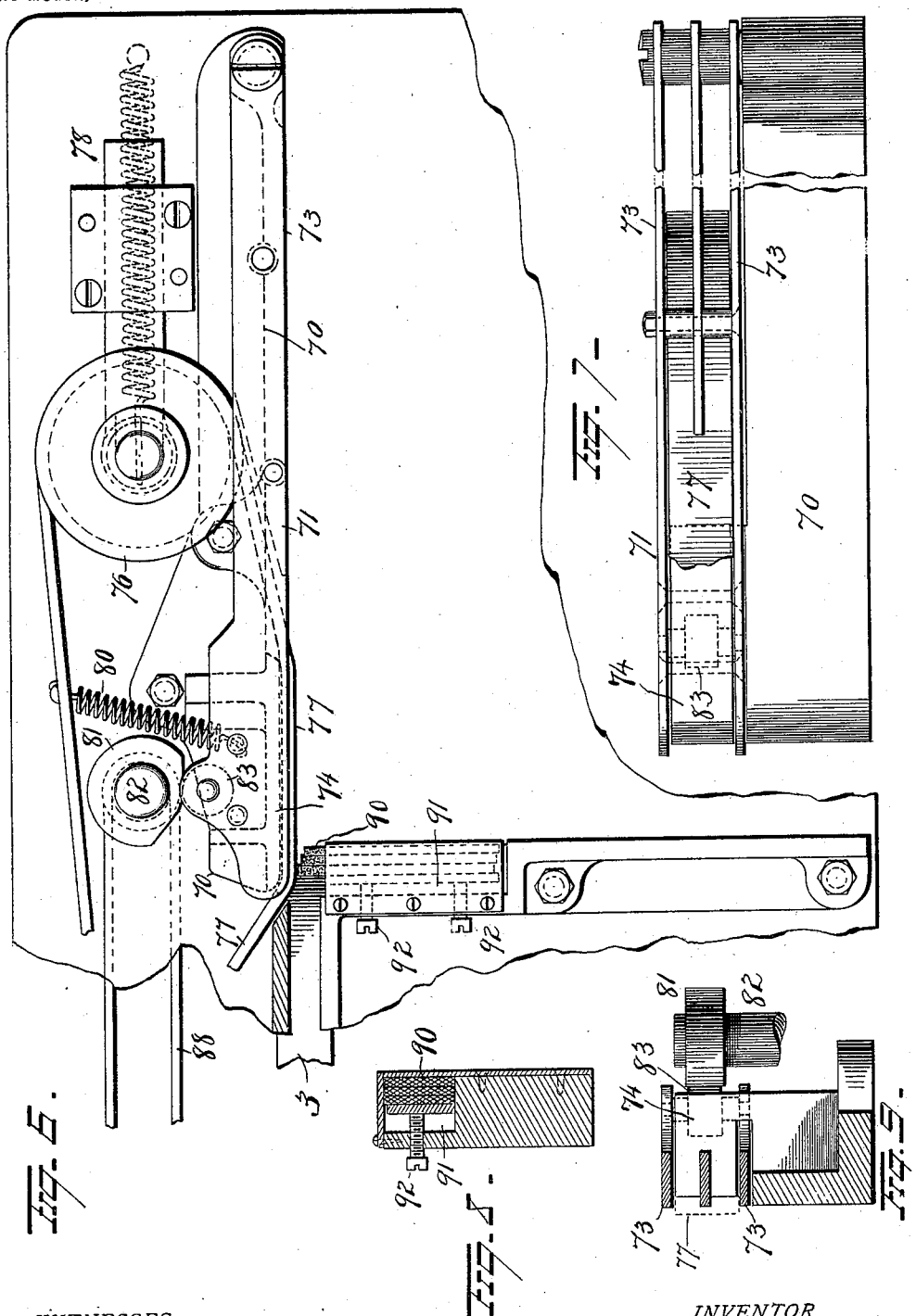

UNITED STATES PATENT OFFICE.

CHARLES PARTRIDGE OUDIN, OF NEW YORK, N. Y., ASSIGNOR TO THE ACME SUPPLY COMPANY, OF SAME PLACE.

MAIL-MARKING MACHINE.

SPECIFICATION forming part of Letters Patent No. 618,720, dated January 31, 1899.

Application filed December 15, 1897. Serial No. 662,022. (No model.)

*To all whom it may concern:*

Be it known that I, CHARLES PARTRIDGE OUDIN, of New York, in the county of New York and State of New York, have invented certain new and useful Improvements in Mail-Marking Machines; and I do hereby declare the following to be a full, clear, and exact description of the invention, such as will enable others skilled in the art to which it appertains to make and use the same.

My invention relates to an improvement in mail-marking machines, the main object being to simplify and reduce the number of parts to a minimum and at the same time attain greater strength and efficiency of parts; and with these objects in view the invention consists in certain novel features of construction and combinations of parts, which will be hereinafter described, and pointed out in the claims.

In the accompanying drawings, Figure 1 is a plan view, parts being in section. Fig. 2 is a view in elevation. Fig. 3 is a horizontal section. Fig. 4 is an enlarged horizontal section showing the printing and impression cylinders and the coöperating mechanism, parts in plan, as well as parts in section. Fig. 5 is a transverse vertical section. Fig. 6 is a plan view of the automatic feed mechanism. Fig. 7 is a view in elevation of a portion of this feed mechanism. Figs. 8 and 9 are details of the same. Figs. 10, 11, 12, 13, 14, 15, and 16 are details.

A represents the main frame of the machine, and the numeral 1 indicates the channel through which the letters or postal cards are fed. In the bottom of this channel the usual horizontal feed-belt 3 travels. B and C represent, respectively, the printing and impression cylinders, to which this belt 3 leads. These cylinders are fixed on shafts 5 and 6, respectively, and they act in unison, as will be explained hereinafter. Printing-cylinder B comprises top and bottom disks, having a portion of the edge cut away, and the central block 7, of general triangular form. This central block 7 is bored out, as at 8, and in it the dating-stamp 9 is yieldingly held, a spring 10 tending to force it outward. A catch 11 retains the stamp in the socket 8, and this catch is provided with a thumb-piece 12, by means of which it is swung outward when it is desired to remove the stamp to change or regulate it. The numeral 14 indicates the die. This die has an L-shaped slot 15 formed therein. The slot opens into the flat inner face of the die and is adapted to receive a pin 16, by means of which the die is held against outward movement. A spring slide-latch 17 retains the die against backward endwise movement. By sliding this latch 17 backward and then the die backward endwise and afterward outward it may be removed, and by reversing the order of these movements the die may be placed in position and secured.

Passing now to the impression-cylinder C, that also comprises some novel features of construction. It comprises in the main a top and bottom disk cut away on a portion of the periphery, just as the disks are in the printing-cylinder, and in corresponding positions. A central block 20 retains the disks properly spaced apart, the rivets 21 21 holding the disks and interposed block rigidly together. The impression-surface is made yielding and consists of a series of superimposed thin segments 22 22. These segments are each backed by a spring 23, the latter conveniently comprising a wire bent around shaft 6, with the ends pressing outward upon the ends of the segments, the said ends of the springs being bent slightly backward, as at 24 24, to present a rounder bearing-surface to the segments, at which point they are dropped into recesses 25 25 formed to receive them. The segments are confined in place between the disks and against the springs by rivets 26 26, which pass through slots 27 and 28. The two outer slots 27 27 enlarge outward, and although the central one, 28, is circular in form, and the shape of all three is such as to afford ample play to the segments, whether it be direct outward and inward or rocking movement due to the initial and final contact at one end or the other rather than direct in the center. The object of this construction of impression-cylinder is to provide not only for different thicknesses of mail-matter, but also and more especially for irregularities in the composition of a single envelop, which not infrequently results from the character of the inclosures which it contains. By this provision any excessive thickness is immediately compensated for, and consequently the impression made is substantially uniform at every point, although without this provision the pressure would increase as the thickness increased and decrease in corresponding ratio as the thickness of the envelop diminished. In addition to this yielding capacity of the impression-surface the entire cylinder, with the shaft 6 upon which it is secured, is supported in a sliding block 30, and this is held yieldingly forward or inward by an arm 31, pivoted on shaft 32. Arm 31 is connected to a similar arm 33, pivoted on shaft 34, and a spring 35 connects the free ends of the two arms 31 and 33. These parts are operated by a cam 36 on shaft 5, which engages an antifriction-roller 37 on lever 33 to force lever 33 outward with each revolution of shaft 5 to impart a variable pressure to the block 30 and the impression-cylinder which it carries, which pressure reaches its maximum while the stamp and die are upon the card or envelop.

Should the card or letter to be marked arrive at the marking-point ahead of the stamp and die, some means for temporarily retarding it is provided, and this consists of a fixed stop 40, which projects far enough across the channel to afford an obstruction to an approaching card or letter with the assistance of the yielding deflector 41. This deflector is pivoted for convenience on a post 42 and its curved deflecting end reaches to the stop 40. The deflector is provided on the opposite side of its pivot, with a lug 43, against which a spring 44 bears. The tension of this spring is just sufficient to resist the tendency of the card or envelop to crowd by, and at the same time it easily yields to lateral pressure exerted at the proper time to force the card or envelop from the stop. This lateral pressure is exerted at the proper time by a lever 46. This lever is pivoted at or near its center on a pin 47. One end is bifurcated, as at 48, to straddle the stop 40, and the other end is connected by a spring 50 to some part of the frame whereby it is held yieldingly inward, and a cam 51 on shaft 34 operates upon an antifriction-roller 52 to swing the lever positively in the opposite direction, as shown in Fig. 4, to force the card or letter off of the stop. When the smaller part of this cam reaches the roller 52, the lever drops back again in response to the pull of the spring until the parts are ready to act on the next card or letter.

The card or letter is given a final thrust against the stop just prior to the canceling operation by a special feeding mechanism now to be described. This comprises two pinching-rollers 55 and 56, faced with rubber or yielding material. The former is mounted upon post 42 and is provided with teeth 57, which intermesh with the teeth of pinion 58 on shaft 32. Roller 56 is supported at the free end of a spring-plate 59. This plate is secured to the frame at some convenient point, as at 60, and near its center it carries a roller 61, which the lower cam 62 on shaft 34 engages during each revolution, the result being to force roller 56 inward to pinch the card or letter between it and companion roller 55, the positive rotation of the latter being just sufficient to give the desired final feed to the card or envelop at just the desired moment when it is taken by the peripheries of the printing and impression cylinders and carried on through the machine. Upon the continuation of the movement of the cam 62 the idle-roller 56 springs outward, due to the tendency of the spring-plate 59 to resume its normal outward position.

As a simple means for automatically feeding the cards and envelops I have provided the following: A block 70 of steel or other hard metal preferably is securely bolted on the frame of the machine with its inner face in line with channel 1. On top of this block and pivoted thereto at one end is a yielding arm 71. This may be variously constructed, of course, but as showing an approved structure three parallel plates 73 73 are used. These are secured together, and between the free ends of the outer two a solid portion 74 is held, it being stationed upon or being an integral part of block 70, as shown in Fig. 9. Around this solid portion 74 and rollers 75 and 76 a vertically-disposed feed-belt 77 passes. Roller 76 is mounted on a spring-actuated slide 78, which applies tension to the belt and takes up the slack. At intervals of feeding the arm 71 is held back, as shown in Fig. 6, by spring 80, the vertical feed-belt 77 at that moment coöperating with the horizontal belt 3; but immediately upon feeding one card or envelop forward a cam 81 on shaft 82 swings around and by its contact with roller 83, journaled in arm 71, forces the latter over the vertical belt, thus shielding it and preventing another card or envelop for the time being from feeding. Belt 77 is driven continuously by shaft 85 through pinion 86, which receives its motion from gear 87 on shaft 32, and shaft 82, which carries the cam 81, is driven by an endless belt 88, which passes around pulleys on shafts 82 and 85. Coöperating with this vertical feed-belt 77 is some suitable follower (not shown) and also some yielding fingers 90 90. These fingers are preferably made of rubber and held removably and adjustably in the arrangement shown in a box 91 provided for it, the screws 92 92 being provided as a convenient means for holding the fingers in proper adjustment. The preferable arrangement is that shown in Fig. 6, in which three are employed, one in advance of the next adjacent, so that while one card or letter is passing on the next is stopped in readiness to follow promptly upon its turn coming, when the arm 71 drops back to expose the vertical belt, so that the card or envelop adjacent is carried forward by the forward movement of the belt.

Motion is imparted to the machine through any chosen motor, and if by electric motor through shaft 93 and bevel-gears 94 and 95 to shaft 5, or if by a belt through pulley 96, shaft 97, and miter-gears 98 and 99 to the shaft 5. From shaft 5 motion is communicated through gear-wheel 100 to gear 101 on shaft 34, which gear meshes with gear-wheel 87, which in turn meshes with gear 102 on shaft 6 and 86 on shaft 85. Gear-wheel 100 also meshes with pinion 103, and the latter with pinion 104, and pinion 104 with pinion 105 on the packer-shaft 106. Thus through this chain of gearing every part of the machine operates with perfect precision at properly-timed intervals and at such speed as is necessary to accomplish the prescribed functions of the machine.

It is evident that slight changes might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a mail-marking machine, the combination with a printing-cylinder, of an impression-cylinder coöperating therewith and comprising two disks spaced apart, a shaft passing through said disks, a series of parallel segments disposed between said disks and constituting a portion of the peripheral wall of the cylinder, and a series of springs mounted on said shaft and pressing against said segments.

2. In a mail-marking machine, the combination with a printing-cylinder, of an impression-cylinder coöperating therewith, said impression-cylinder having a segmental impression-surface consisting of a series of parallel segments having transverse slots therein, a spring behind each segment and pins passing through the alined transverse slots of the segments.

3. In a mail-marking machine, the combination with a printing-cylinder, of an impression-cylinder, the impression-surface of which is composed of a series of superimposed slotted segments, springs bearing at their free ends against the ends of the segments and the slots in the segments being such that the segments may rock or slide during the rotation of the impression-cylinder.

4. In a mail-marking machine, an impression-cylinder, comprising two disks, an interposed spacing-block, and a series of sliding and rocking spring-actuated superimposed segments.

5. In a mail-marking machine, the combination with printing and impression cylinders, one of which is mounted on a sliding block, the impression-cylinder having its impression-surface made up of independent spring-actuated segments, of means for creating a variable pressure between the two cylinders.

6. In a mail-marking machine, the combination with printing and impression cylinders, and a rigid stop, of a bifurcated spring-actuated lever for clearing the card or envelop from the stop at the proper time, a yielding deflector, and a pair of yielding rollers for imparting the final thrust to the card or envelop, one of these rollers being carried by a spring-arm and a shaft having cams thereon for operating the lever and spring-arm.

7. In a mail-marking machine, the combination with printing and impression cylinders, a stop, a spring-actuated deflector and lever for removing a card or letter from the stop, of a pair of feed-rollers faced with yielding material, a spring-arm carrying one of these rollers, and means for forcing it yieldingly toward the other roller.

8. In a mail-marking machine, the combination with printing devices and an endless belt, of a channel constructed and adapted to receive material at one end from said endless belt and deliver it to said printing devices, a box or receptacle and a series of yielding fingers of different lengths clamped in said box or receptacle and projecting partially across the mouth of said feed-channel, substantially as set forth.

9. In a mail-marking machine, the combination with a pivoted arm, of an endless belt passing through and around a portion of said arm, a cam engaging the free end of the arm to force it in one direction and a spring for moving said arm in the other direction, substantially as set forth.

In testimony whereof I have signed this specification in the presence of two subscribing witnesses.

CHARLES PARTRIDGE OUDIN.

Witnesses:
CHAS. T. LUTHER,
R. H. SMITH.